(12) United States Patent
Westervelt

(10) Patent No.: US 6,926,125 B1
(45) Date of Patent: Aug. 9, 2005

(54) PREMATURE ACTIVATION STOP FOR TOWED VEHICLE CABLE BRAKING SYSTEMS

(75) Inventor: Neil Westervelt, Iola, KS (US)

(73) Assignee: Night Shift Auto, Iola, KS (US)

( * ) Notice: Subject to any disclaimer, the term of this patent is extended or adjusted under 35 U.S.C. 154(b) by 61 days.

(21) Appl. No.: 10/682,071

(22) Filed: Oct. 10, 2003

(51) Int. Cl.$^7$ ............................................. B60T 7/20
(52) U.S. Cl. ................ 188/112 R; 280/430; 280/446.1
(58) Field of Search ........................ 188/112 R, 112 A, 188/2 D; 280/428, 430, 432, 446.1, 486, 280/487

(56) References Cited

U.S. PATENT DOCUMENTS

| | | | |
|---|---|---|---|
| 2,107,312 A | 2/1938 | Thompson | |
| 2,468,669 A | 4/1949 | Holmes | |
| 2,522,855 A | 9/1950 | Brown | |
| 2,665,128 A | 1/1954 | Guffey | |
| 3,318,422 A | 5/1967 | Frescura | |
| 3,610,434 A | 10/1971 | Herbert | |
| 3,682,278 A | * 8/1972 | Wherry et al. | 188/112 R |
| 3,881,577 A | * 5/1975 | Wherry et al. | 118/112 R |
| 4,223,766 A | 9/1980 | Huetsch et al. | |
| 4,239,252 A | 12/1980 | Huetsch et al. | |
| 5,195,768 A | 3/1993 | Hendrix | |
| 5,762,167 A | 6/1998 | Hendrix | |
| 5,771,996 A | 6/1998 | Marasco | |
| 6,035,977 A | 3/2000 | Marasco | |
| 6,264,228 B1 | 7/2001 | Westervelt | |

* cited by examiner

Primary Examiner—Pam Rodriguez
(74) Attorney, Agent, or Firm—Dowell & Dowell, P.C.

(57) ABSTRACT

A safety stop for preventing activation of brakes of a towed vehicle by a cable braking system connected between a towing vehicle and the towed vehicle until a predetermined load is placed on the cable system such that premature activation of the system is prevented.

5 Claims, 2 Drawing Sheets

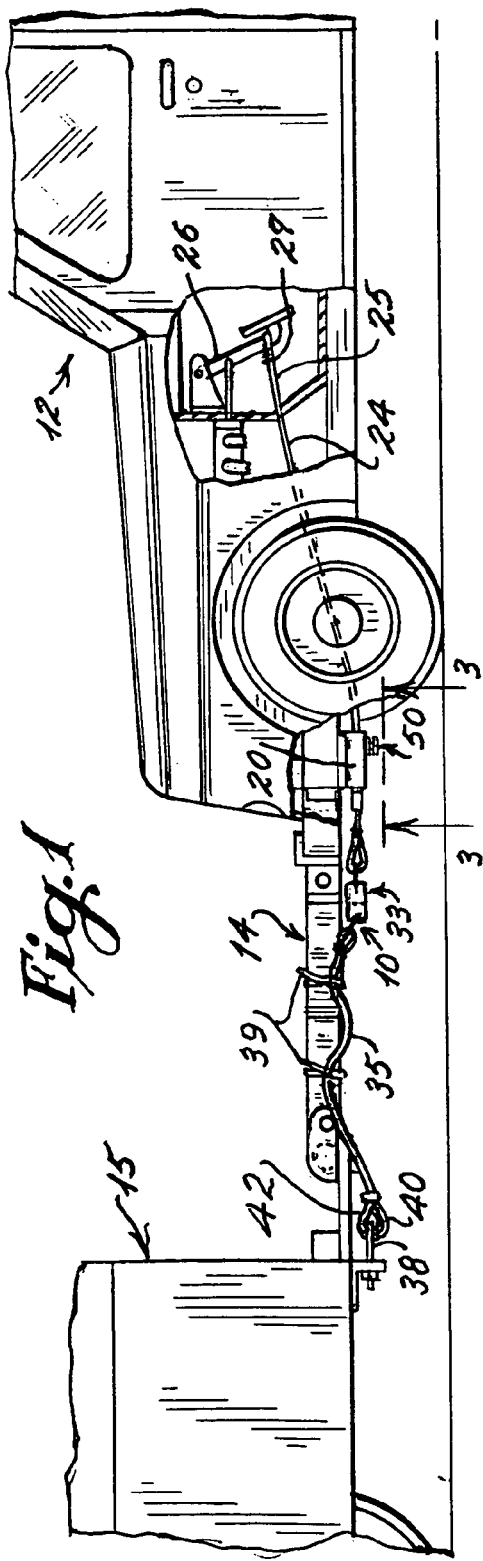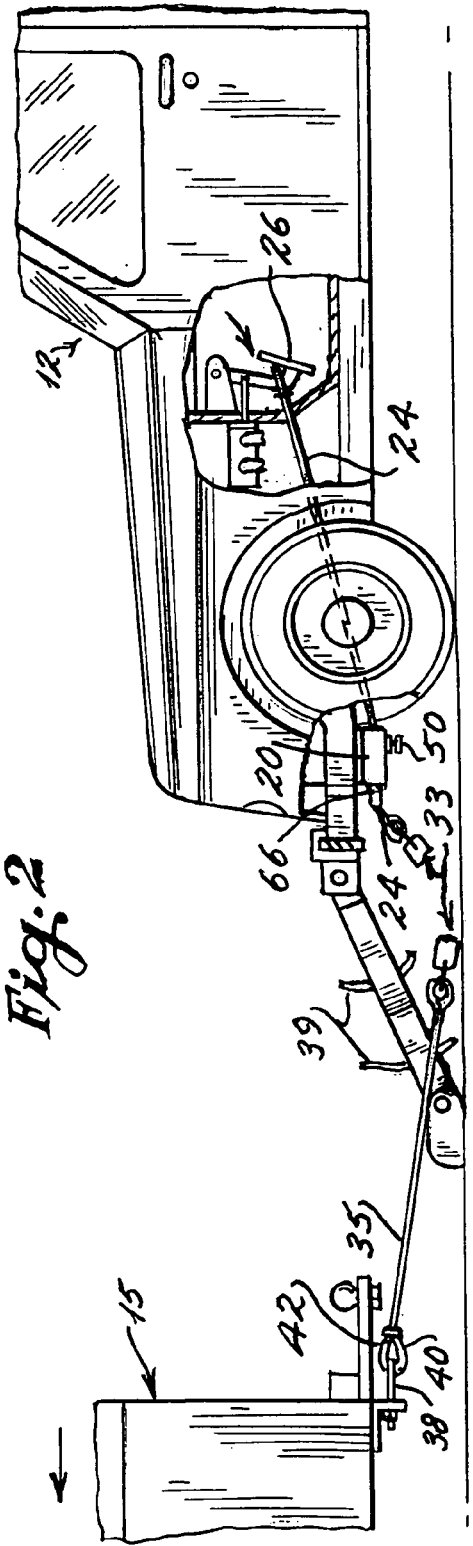

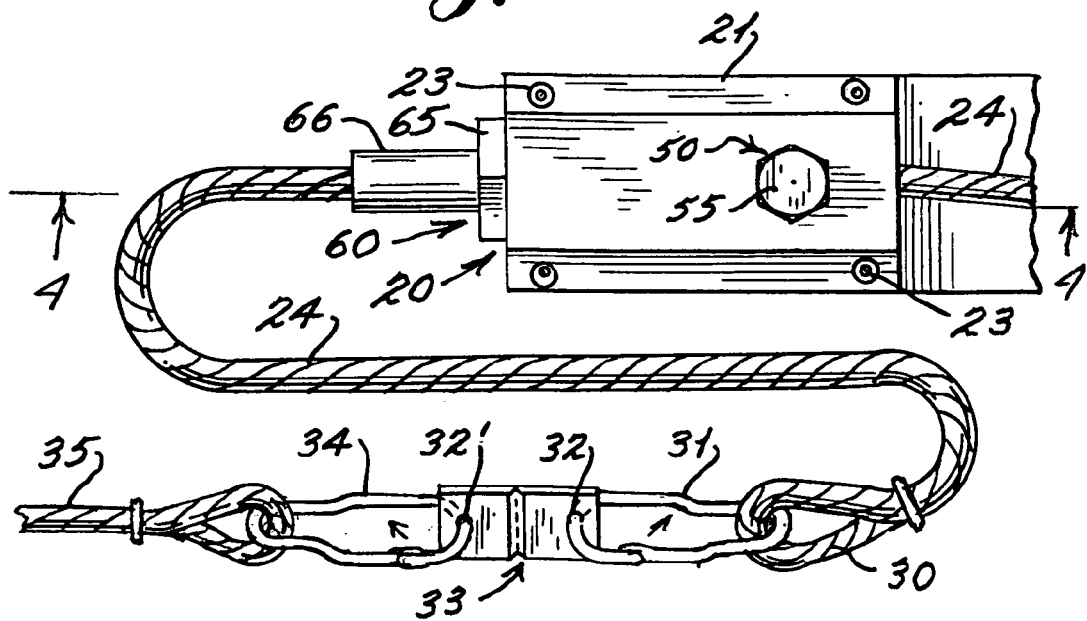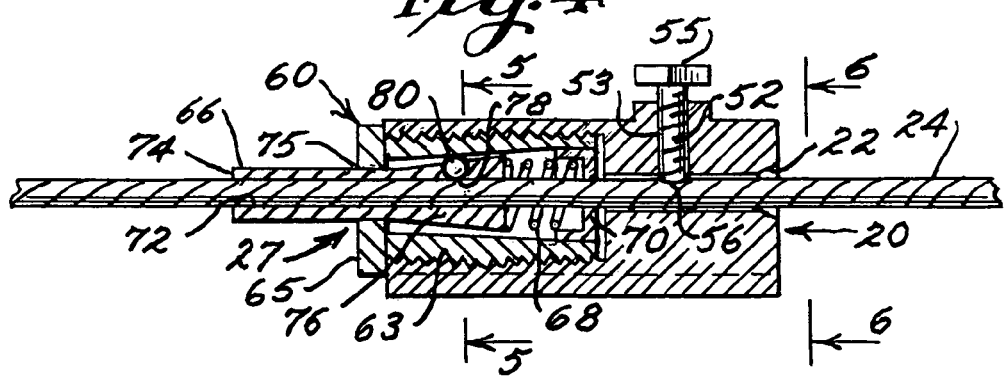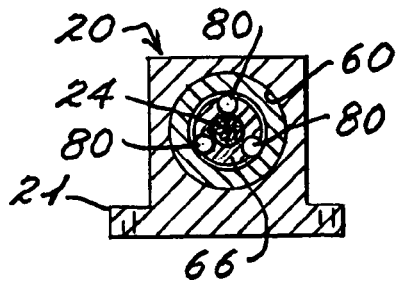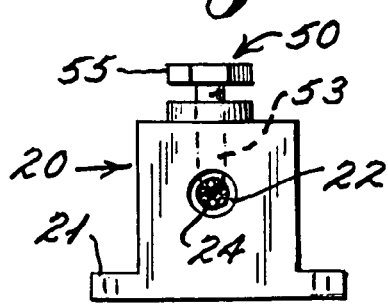

PREMATURE ACTIVATION STOP FOR TOWED VEHICLE CABLE BRAKING SYSTEMS

BACKGROUND OF THE INVENTION

1. Field of the Invention

This invention is generally directed to cable braking systems which are used to automatically apply the brakes of a vehicle which is being towed behind a towing vehicle in the event the towed vehicle becomes separated from the towing vehicle, such as by failure of a hitch or tow bar. More particularly, the present invention is directed to a stop mechanism or safety device for preventing the cable of the cable braking system from prematurely activating the brakes of a towed vehicle under situations such as sharp turns or minor accidents wherein there is no necessity for the application of the brakes of the towed vehicle. The stop device is automatically overcome in the event a sufficient load is placed on the cable brake system, such as when the towed vehicle becomes mechanically separated from the towing vehicle, so that the cable braking systems functions in its conventional manner to apply the brakes of the towed vehicle to prevent its movement should such mechanical separation occur.

2. Brief Description of the Related Art

Cable braking systems are used to prevent runaway of a vehicle being towed by a towing vehicle should the towing connection between the two vehicles become disrupted while the vehicles are in motion. As a matter of safety, most states now require that some system be applied between a towing vehicle, such as a motor home, and a vehicle being towed, such as a car, to ensure that the car or towed vehicle is automatically stopped in the event the car or other vehicle breaks away from the towing vehicle either due to accident or mechanical failure of the tow bar or hitch system connecting the two vehicles.

There have been numerous cable braking systems designed for automatically applying the brakes of a towed vehicle should conditions warrant the application of the brakes to prevent runaway of the vehicle. Generally, such systems include a high strength cable which extends through the firewall of the towed vehicle wherein one end of the cable is clamped or otherwise mechanically attached either to the brake pedal or to an emergency brake lever. The opposite end of the cable is attached to a mechanism which causes the application of a force on the cable to apply the brakes of the towed vehicle should conditions warrant the application of the brakes.

Some such cable braking systems are interconnected with a vehicle towing package. Such systems therefore require a vehicle operator to reconfigure a conventional tow bar or hitch system in order in incorporate the activation device for the vehicle braking cables.

Other systems, however, are designed to brake totally independently of the tow bar or hitch system and thus can be placed into service without having to modify the vehicle towing package.

One such independently operated break-away cable system is sold on the market under the name of Ready Stop Towed Break-Away System RS-5000, manufactured and distributed by Night Shift Auto of Iola Kans. The vehicle break-away system is specifically designed to allow the brakes of a towed vehicle to be applied to an effective force, approximately 300 pounds, should the towed vehicle separate from the towing vehicle. This amount of force is ensured by providing a mechanical break-away along the length of the cable system so that should a vehicle separation occur, the mechanical break-away device will effectively sever, separating the cable system only after 300 pounds of force has been applied to the towed vehicle brakes so that the vehicle brakes are soundly engaged to prevent movement of the towed vehicle.

The Ready Stop Towed Break-Away System includes a cable component which is designed to be secured at one end about the towed vehicle brake pedal or to a lever associated with the parking brake system of the vehicle. The cable extends therefrom through the vehicle firewall and a guide housing which is mounted just rearwardly of the front bumper of the towed vehicle. A one way clutch mechanism is provided within the housing through which the first cable extends such that the cable can only move in one direction toward the towed vehicle such that once the towed vehicle brakes are applied, the first cable is locked in position to prevent brake release. The opposite end of the first cable is secured to a mechanical break-away link member which is designed to fracture at approximately 300 pounds of force such the mechanical link separates the cable system allowing the towing vehicle to be completely separated from the towed vehicle only after sufficient braking force is applied to the towed vehicle brakes. The system further includes a second cable component having one end connected to the mechanical break-away link and an opposite end which is designed to be connected to the towing vehicle by appropriate clamps.

It has been determined that often, due to a sharp turn, fender-bender or other non-serious or life threatening accident, slack along the cable is taken up and the cable brake system becomes prematurely partially or totally applied. Under such circumstances, if an operator does not become readily aware of the partial application of the brakes of the towed vehicle, damage to both vehicles can occur. Thus, the operator must take immediate corrective action by pulling off a roadway in order to reset the cable system.

In view of the foregoing, there is a need to provide a safety device for preventing the premature activation of the cable brake system in the event of a minor vehicle accident or other occurrence wherein the vehicles are not separated with respect to one another but wherein a partial application of the towed vehicle brakes could occur.

SUMMARY OF THE INVENTION

The present invention is directed to a cable brake system for automatically applying the brakes of a towed vehicle should the towed vehicle become separated from a towing vehicle while also insuring that the brakes of the towed vehicle are applied to a predetermined amount of force before the cable brake system severs between the towing and the towed vehicle. The invention further prevents premature activation of the towed vehicle brakes.

The cable brake system includes a first cable having one end designed to be secured to the brake pedal or a brake lever associated with the towed vehicle and an opposite end which is connected to a mechanical break-away link. The mechanical break-away link fractures and severs the first cable from a second cable in the event a predetermined force is applied in tension along the length of the cable system.

The first cable extends through a housing which is adapted to be mounted to a forward portion of the towed vehicle which housing not only serves as a guide for the cable but also includes a one way clutch mechanism which permits the cable to move in only one direction towards the towed vehicle. In some embodiments, the clutch mechanism allows a quick release of the cable to permit the cable brake system to be reset after activation.

The cable brake system further includes the second brake cable which extends from the mechanical break-away link member to an opposite end which is adapted to be secured directly to a frame component of the towing vehicle by suitable clamps.

To prevent premature activation of the brakes of a towed vehicle, the present invention provides a safety stop device which is mounted to the guide housing. In a preferred embodiment, the safety stop device includes a bolt member which is adjustably mounted so as to be axially moveable so that a forward end of the bolt can be brought into selective engagement with the first cable so that pressure can be applied to prevent the premature movement of the cable relative to the housing. The bolt may include a manually engageable portion such that only manual force is necessary to adjust the bolt to tighten it against the cable to provide an initial holding force to prevent the premature application of the towed vehicle brake system.

In an alternate embodiment of the invention, the safety stop may be in the form of a mechanism such as a shear bolt which has a predetermined shear failure strength such that if a predetermined force is applied along the length of the first cable, the safety stop will shear in two allowing normal operation of the cable braking system.

It is a primary object of the present invention to provide a vary reliable and easily activated safety stop mechanism for preventing premature activation of a cable brake system but which allows the cable brake system to function in a conventional manner in the event of a vehicle separation.

It is a further object of the invention to provide a system for preventing the premature activation of a cable brake system which can be activated without the use of tools and which is effective to prevent premature brake application during minor vehicle accidents and other occurrences.

BRIEF DESCRIPTION OF THE DRAWINGS

A better understanding of the invention will be had with reference to the accompanying drawings wherein:

FIG. 1 is an illustrational view having portions broken away showing the cable brake system installed between a towing vehicle and a towed vehicle;

FIG. 2 is an illustrational view similar to FIG. 1 showing the cable brake system activated to apply the towed vehicle brakes;

FIG. 3 is a top plan view of the cable brake housing and break-away link of the invention;

FIG. 4 is a cross-sectional view taken along line 4—4 of FIG. 3;

FIG. 5 is a cross-sectional view taken along line 5—5 of FIG. 4 and

FIG. 6 is a cross-sectional view taken along line 6—6 of FIG. 4.

DESCRIPTION OF THE PREFERRED EMBODIMENT

With continued reference to the drawing Figures, a cable braking system 10 is shown for applying the brakes of a towed vehicle 12 which is connected by a conventional tow bar assembly 14 to a towing vehicle 15.

The cable brake system 10 includes a guide housing 20 having a base 21 adapted to engage against a frame component of the towing vehicle and be secured thereto such as by mounting bolts 23. The housing includes a through passageway 22, see FIG. 4, through which a first cable 24 extends. The cable 24 is preferably a 16th of an inch aircraft cable having a first end 25 which is designed to be engaged about the brake pedal 26, see FIGS. 1 and 2, or an emergency brake lever (not shown), afterwhich the end 25 is clamped to itself using a clamp 29. During installation, the cable 24 passes through a pre-drilled opening in the firewall of the towed vehicle which opening is sealed once the cable passes therethrough.

The opposite end 30 of cable 24, see FIG. 3, is secured to a spring latch hook 31 which connects through a first opening 32 in a break-away or weak-link device 33. The break-away device is designed to sever at a predetermined load or tension force which, in the preferred embodiment, is approximately 300 pounds. When an excess of 300 pounds is placed along the cable 24 to engage the brake 26, any additional force will serve to automatically sever the member 33 thereby effectively severing the cable brake system 10. During a vehicle separation, such as when the tow bar fails as shown in FIG. 2, the first cable 24 is pulled in a direction toward the towing vehicle and cannot be moved in an opposite direction because of a one way clutch mechanism 27 mounted within the housing 20.

An opposite end of the break-away member 33 includes another opening 32' which receives a spring latch hook 34 of a second cable 35 which is of the same size and material as the first cable 24. The cable 35 extends to an attachment loop 38 which is secured to the towing vehicle. A spring clip or clamp 40 is provided along the outer end 42 of the cable 35 in order to provide a quick disconnect with the loop 38.

During installation, approximately 3 to 5 inches of cable should be provided as slack along the length of the cable 24. Additional slack should also be provided along the cable 35 to permit turning of the towing vehicle relative to the towed vehicle without placing any pulling force on the cable brake system which would tend to move the first cable 24 to activate the brake pedal 26. In this respect, the second cable 35 should be loosely tied along the length of the tow bar by plastic or wire ties 39.

As previously described, in some instances, it is possible that if sufficient slack is not provided along the length of the cable or if there is a minor accident, it is possible to apply a pulling force on the first cable 24 to at least partially engage the brake pedal 26. This could have an adverse effect on the towed vehicle as well as the towing vehicle. In order to prevent this, the present invention incorporates a safety stop 50 which mechanically engages the first cable 24 to provide sufficient force to prevent premature activation of the cable brake system. In the embodiment shown, the safety stop 50 is in the form of a bolt having a threaded end portion 52 which is receivable within a threaded opening 53 of the housing 20. The opening 53 aligns with the cable 24. The stop 50 includes a manually engageable head portion 55 so that the bolt may be threaded and tightened manually such that a lower end 56 thereof frictionally engages the first cable 24 to prevent premature movement of the cable. In a preferred embodiment, the bolt is a plastic or nylon bolt which applies approximately 35–40 pounds of force on the cable 24 when manually tightened.

The amount of force applied is limited because of the manual application of pressure and thus, in the event of a vehicle separation, when it is necessary to apply brake 26, once sufficient force is applied, the cable brake system will function in its designed capacity to apply a force to pull the cable 24 taut to activate the towed vehicle brakes.

In some embodiments, as opposed to the bolt structure shown in the drawing figures, the bolt may have a predesigned shear strength such that the bolt fails along a portion thereof when a predetermined amount of force is applied thus preventing any interference of the safety stop with the activation of the cable brake system. In addition, other types of mechanical devices for providing a limited amount of force to prevent inadvertent activation or movement of the cable braking system may also be used.

As previously noted, the housing 20 includes a one-way clutch mechanism 27 to prevent movement of the cable 24 toward the towing vehicle so that the towed vehicle brakes 26 remain applied after the cable 24 moves or is pulled taut. This clutch mechanism is important to ensure that the towed vehicle brakes remain applied after the vehicle separates.

The clutch mechanism may take many forms however, one such mechanism is shown in FIG. 4. The mechanism includes an outer hollow bolt 60 which is threadingly engaged with a threaded bore 63 of the housing 20. The inner walls of the hollow bolt are tapered inwardly toward the bolt head 65. A slideable hollow piston 66 is mounted within the bore of the hollow bolt and is constantly urged toward the bolt head by an internal spring 68. The spring is retained by an end cap 70 which is seated with the bore 63 of the housing.

The piston includes a channel 72 therethrough through which the first cable 24 extends and has an outer end 74 which extends through an opening 75 in the hollow bolt head 65. The piston includes a tapered section 76 in which a plenty of openings 78 are provided for seating locking balls 80. Because of the tapered section of the piston and the tapered walls of the hollow bolt, the spring 68 provides a force which urges the locking balls into engagement with the cable 24, see FIGS. 4 and 5, to thereof prevent movement of the cable toward the towing vehicle and away from the towed vehicle. However, should the cable brake system become activated and the break-away link fail during vehicle separation, the clutch mechanism will be effective to lock the first cable 24 in a position to retain the towed vehicle brakes 26 in an applied condition.

Reset of the cable brake system is possible by merely pushing the piston 66 toward the right in FIG. 4 thus disengaging the locking balls 80 from the cable 24.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. In a towed vehicle braking system including a first brake applying cable having a first end for connecting to a brake actuating pedal or lever of a towed vehicle and a second end for connecting to a break-away link member and wherein the first cable extends through a guide housing adapted to be mounted to the towed vehicle forwardly of the brake pedal or lever and wherein the housing includes a one way clutch mechanism for maintaining brakes of the towed vehicle applied when activated, and wherein the system includes a second cable having a first end for connecting to the break-away member and a second end for connecting to a towing vehicle, the improvement comprising, force applying means mounted to the housing for applying a force on the first cable to prevent movement of the first cable until a predetermined load is placed on the first cable by the towed vehicle, afterwhich the first cable is moveable relative to the force applying means to apply braking force to the brake actuating pedal or lever of the towed vehicle.

2. The towed vehicle brake system of claim 1 wherein said force applying means mounted to the housing for applying a force on the first cable includes a member having an end engageable with the first cable within the guide housing, said member being selectively radially adjustable relative to the first cable.

3. The vehicle brake system of claim 2 wherein said member is a bolt element having a threaded portion and a manually engageable outer end portion.

4. The vehicle brake system of claim 3 wherein said bolt is formed of a plastic or nylon material capable of applying a force of approximately 35–40 pounds on the first cable when manually tightened.

5. The vehicle brake system of claim 2 in which said member is a bolt designed to shear at a predetermined load.

* * * * *